United States Patent
Grooters

(10) Patent No.: US 6,883,176 B1
(45) Date of Patent: Apr. 19, 2005

(54) METHOD AND APPARATUS FOR LAUNCHING APPLICATIONS BASED UPON ELECTRONIC PROGRAM GUIDE DATA

(75) Inventor: Brandon A. Grooters, Watauga, TX (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 09/461,822

(22) Filed: Dec. 15, 1999

(51) Int. Cl.$^7$ ............................ G06F 3/00; G06F 13/00; H04N 5/445

(52) U.S. Cl. .............................. 725/39; 725/38; 725/40; 725/48; 725/49; 725/58; 718/100; 718/102

(58) Field of Search .............................. 725/38, 39, 40, 725/48, 49, 58; 718/100, 102

(56) References Cited

U.S. PATENT DOCUMENTS

| | | | |
|---|---|---|---|
| 5,548,340 A | 8/1996 | Bertram ...................... 348/559 |
| 5,564,043 A | 10/1996 | Siefert ........................ 395/600 |
| 5,585,838 A | * 12/1996 | Lawler et al. ................ 725/54 |
| 5,692,214 A | * 11/1997 | Levine ........................ 710/13 |
| 5,724,530 A | 3/1998 | Stein et al. .................. 395/329 |
| 5,732,266 A | 3/1998 | Moore et al. ................ 395/651 |
| 5,787,448 A | 7/1998 | Anderson et al. ........... 707/501 |
| 5,790,120 A | 8/1998 | Lozares et al. ............. 345/349 |
| 5,805,154 A | 9/1998 | Brown ....................... 345/327 |
| 5,806,079 A | 9/1998 | Rivette et al. .............. 707/512 |
| 5,806,089 A | 9/1998 | Garza .............................. 2/12 |
| 5,818,440 A | 10/1998 | Allibhoy et al. ............ 345/327 |
| 5,835,717 A | 11/1998 | Karlton et al. ........ 395/200.47 |
| 5,859,978 A | 1/1999 | Sonderegger et al. .. 395/200.56 |
| 5,905,248 A | 5/1999 | Russell et al. ............. 235/462 |
| 5,986,650 A | * 11/1999 | Ellis et al. .................... 725/40 |
| 6,199,136 B1 | * 3/2001 | Shteyn ........................ 710/305 |

OTHER PUBLICATIONS

Ehrmantraut, Michael et al. "The Personal Electronic Program Guide—Towards the Pre-selection of Individual TV Programs" Nov. 1996, Proceedings of the fifth international conference on Information and knowledge management.*

Takagi, T et al. "Conceptual matching and its applications to selection of TV program and BGMs" Oct. 1999, Systems, Man, and Cybernetics, 1999. IEEE SMC'99 Conference Proceedings, vol: 3, pp. 269–273.*

* cited by examiner

*Primary Examiner*—Anthony Knight
*Assistant Examiner*—Thomas Pham
(74) *Attorney, Agent, or Firm*—Jeffrey A. Proehl

(57) ABSTRACT

Information stored in a database of an electronic program guide is utilized to launch or terminate execution of one or more applications based upon the electronic program guide information. An application to be controlled is associated with an event and registered in a registry database. The event is determined in one embodiment by the electronic program guide. As information is received by an information handling system, the event information is monitored to determine whether the event has occurred. Upon the occurrence of the event, such as when the present time is a predetermined time, the associated application is launched or terminated according to the determined event.

18 Claims, 4 Drawing Sheets

METHOD AND APPARATUS FOR LAUNCHING APPLICATIONS BASED UPON ELECTRONIC PROGRAM GUIDE DATA

FIELD OF THE INVENTION

The present invention generally relates to the field of information handling systems, and particularly to electronic program guide systems.

BACKGROUND OF THE INVENTION

An electronic program guide (EPG) is often utilized in conjunction with the viewing of scheduled programming information. EPG data may be downloaded from an appropriate source and stored in an EPG database. The EPG displays the programming information on a display such that a user may browse the information to make viewing decisions based upon the EPG information. A need exists, however, to extend the utility of the EPG information to many purposes other than to mere browsing of programming information.

BRIEF DESCRIPTION OF THE DRAWING

The numerous advantages of the present invention may be better understood by those skilled in the art by reference to the accompanying figures in which.

DETAILED DESCRIPTION OF THE INVENTION

Reference will now be made in detail to a presently preferred embodiment of the invention, an example of which is illustrated in the accompanying drawings.

Figure 1:
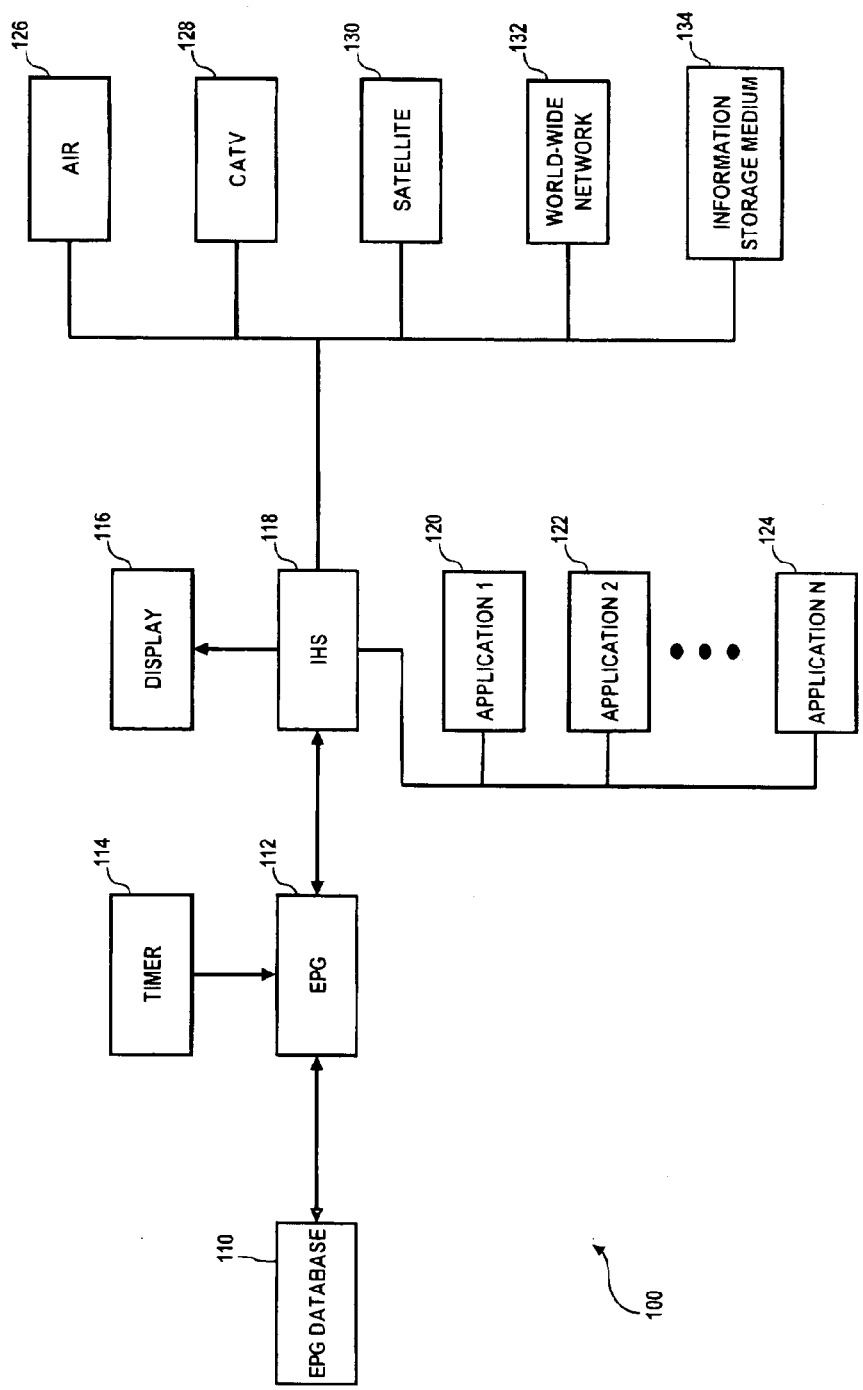
FIG. 1 is a system block diagram in accordance with the present invention.

Referring now to FIG. 1, a system block diagram in accordance with the present invention will be discussed. System 100 includes an information handling system 118 that is capable of running an electronic program guide (EPG) 112 program for maintaining an electronic program guide database 110. Information handling system 118 is capable of receiving information from at least one or more information sources. For example, information handling system 118 may receive airwave based information (AIR) 126 from a television broadcasting network. Such information is typically broadcast via a radio frequency (RF) signal through the air as a transmission medium and may include local and network television broadcasts. Likewise, information handling system 118 may be capable of receiving information broadcast via a cable television network (CATV) 128 in a manner similar to airwave based information 126 except that, instead of using the air as a transmission medium, information may be broadcast as an electronic or light wave signal via a transmission line of cable television network 128, for example via a coaxial cable or fiber optic transmission line. Furthermore, information handling system 118 may be capable of receiving information broadcast from a satellite network system (SATELLITE) 130 in which case programming and other information may be broadcast from and earth orbiting vehicle such as a satellite to information handling system 118 via the earth's atmosphere and/or outer space using an appropriate electromagnetic based signal (e.g., microwave). In addition, information handling system 118 may be configured to receive information from a worldwide network (WORLD-WIDE NETWORK) 132 via an appropriate network connection. Information handling system 118 may be coupled via a direct connection to worldwide network, for example via a T1 class transmission line, via cable telephone network 128 using a cable modem, via a telephone network using a standard telephone dial-up connection (e.g., POTS), through an ISDN line connection, and so on. Information may be broadcast to information from any one or more devices similarly coupled to worldwide network 132. In one embodiment of the present invention, worldwide network 132 is the Internet. In another embodiment, information handling system 118 may receive information from an information storage medium 134 such as a videocassette in a video cassette recorder (VCR), a compact disk or laser disk in an appropriate disk player, a digital versatile disk (DVD) in a digital versatile disk player, a hard-disk drive and/or a semiconductor based memory device from an appropriate digital video device, and so on. As a whole, airwave network 126, cable television network 128, satellite network 130, worldwide network 132, and information storage medium 134 may be considered as one or more information sources. Information received by any one or more of information sources 126–134 may be received by information handling system 118 and displayed on display 116 for viewing by a user. Similarly, information handling system 118 may display EPG data stored in EPG database 110 on display 116 in a format and interface generated by EPG 112. Information stored in EPG database 110 corresponds to scheduled information capable of being received from one or more of information sources 126–134 at predetermined times and on predetermined channels. Information in EPG database 110 may be updated, for example, by accessing an appropriate device (not shown) coupled to worldwide network 132 and downloading the updated information to EPG database 110.

In operation of the present invention, a user of system 100 may be tuned to a particular channel of any one or more of information sources 126–134. For example, the user may be tuned to watch a program broadcast on a particular channel of cable television network 128. During such activity, upon the occurrence of a predetermined triggering event or information, one or more applications 120, 122, and up to N applications 124, may be launched in response to the occurrence of a predetermined triggering event or information. Any one or more of applications 120–124 may be capable of being executed as a program of instructions on information handling system 118. In one embodiment, the triggering event may be based upon an occurrence or duration of time and as such may be based upon a timing signal received by timer 114. In one embodiment, timer 114 may be a system clock, or based thereon, of information handling system 118.

Figure 2:
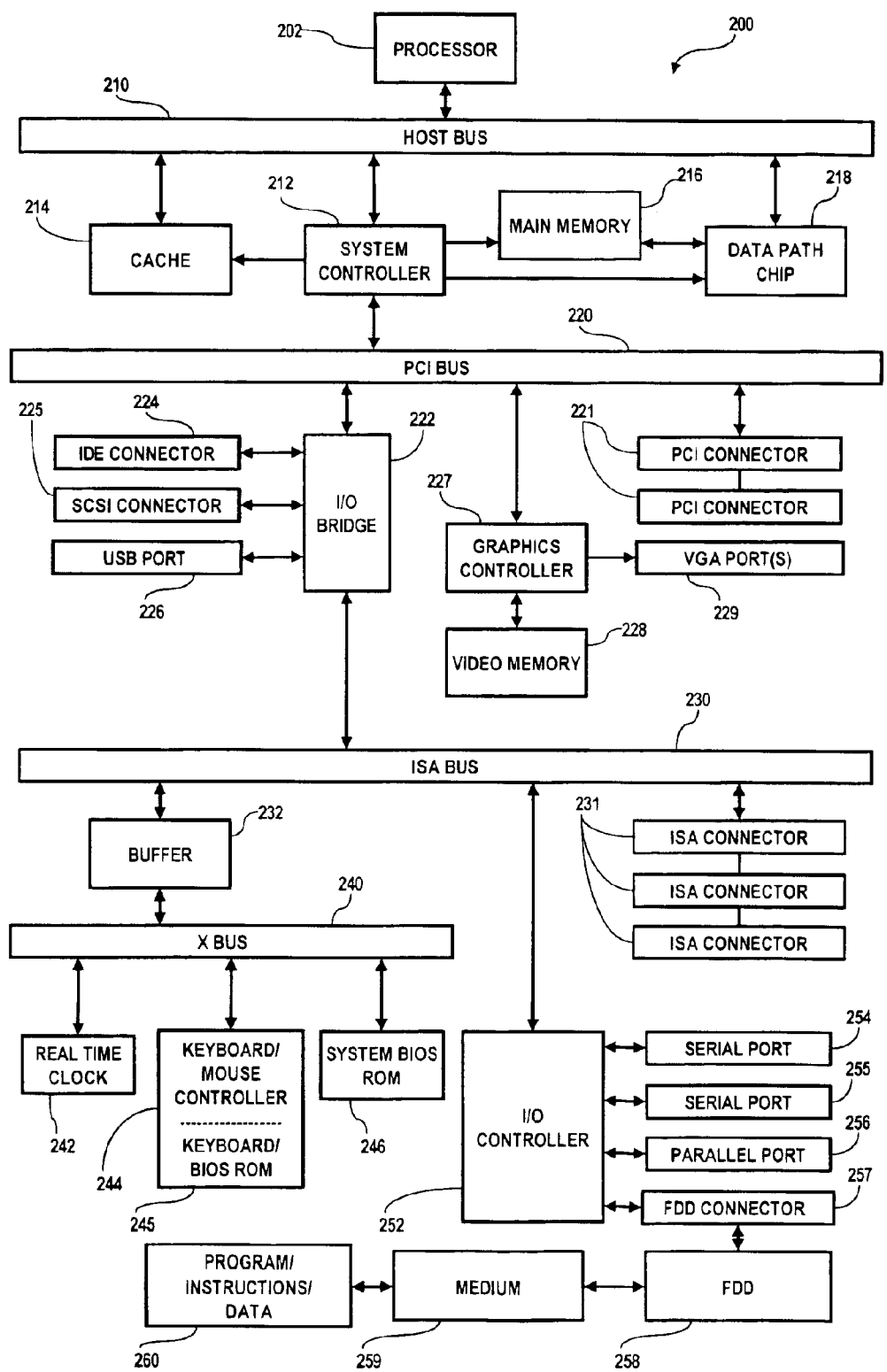
FIG. 2 is a block diagram of an information handling system operable to tangibly embody the present invention.

FIG. 2 shows a block diagram of an information handling system 200 in accordance with the present invention. Information handling system 200 as discussed in FIG. 2 may be one tangible embodiment of information handling system 118 discussed with respect to FIG. 1. In the embodiment of FIG. 2, processor 202, system controller 212, cache 214, and data-path chip 218 are each coupled to host bus 210. Processor 202 is a microprocessor such as a 486-type chip, a Pentium®, Pentium II®, Pentium III®, or the like suitable microprocessor. Cache 214 provides high-speed local-memory data (in one embodiment, for example, 512 KB of data) for processor 202, and is controlled by system controller 212, which loads cache 214 with data that is expected to be used soon after the data is placed in cache 214 (i.e. in the near future). Main memory 216 is coupled between system controller 212 and data-path chip 218, and in one embodiment, provides random-access memory of between 16 MB and 128 MB of data. In one embodiment, main memory 216 is provided on SIMMs (Single In-line Memory Modules), while in another embodiment, main memory 216 is provided on DIMMs (Dual In-line Memory Modules), each of which plugs into suitable sockets provided on a motherboard holding these components and many of the other components shown in FIG. 2. Main memory 216 includes standard DRAM (Dynamic Random-Access Memory), EDO (Extended Data Out) DRAM, SDRAM (Synchronous DRAM), or the like suitable memory technology. System controller 212 controls PCI (Peripheral Component Interconnect) bus 220, a local bus for system 100 that provides a high-speed data path between processor 202 and various peripheral devices, such as video, disk, network, etc. Data-path chip 218 is also controlled by system controller 212 to assist in routing data between main memory 216, host bus 210, and PCI bus 220.

In one embodiment, PCI bus 220 provides a 32-bit-wide data path that runs at 33 MHz. In another embodiment, PCI bus 220 provides a 64-bit-wide data path that runs at 33 MHz. In yet other embodiments, PCI bus 220 provides 32-bit-wide or 64-bit-wide data paths that run at higher speeds. In one embodiment, PCI bus 220 provides connectivity to I/O bridge 222, graphics controller 227, and one or more PCI connectors 221, each of which accepts a standard PCI card. In one embodiment, I/O bridge 222 and graphics controller 227 are each integrated on the motherboard along with system controller 212, in order to avoid a board-to-connector-to-board signal crossing interface and thus provide better speed and reliability. In the embodiment shown, graphics controller 227 is coupled to a video memory 228 that includes memory such as DRAM, EDO DRAM, SDRAM, or VRAM (Video Random-Access Memory), and drives VGA (Video Graphics Adapter) port 229. VGA port 229 can connect to VGA-type or SVGA (Super VGA)-type displays or the like, for example, display 116. Other input/output (I/O) cards having a PCI interface can be plugged into PCI connectors 221.

In one embodiment, I/O bridge 222 is a chip that provides connection and control to one or more independent IDE connectors 224 and SCSI connectors 225, to a USB (Universal Serial Bus) port 226, and to ISA (Industry Standard Architecture) bus 230. In this embodiment, IDE connector 224 provides connectivity for up to two or more standard IDE-type devices such as hard disk drives, CD-ROM (Compact Disk-Read-Only Memory) drives, DVD (Digital Video Disk or Digital Versatile Disk) drives, or TBU (Tape-Backup Unit) devices. In one similar embodiment, two IDE connectors 224 (second connector not shown) are provided, and each provide the EIDE (Enthanced IDE) architecture. In the embodiment shown, SCSI (Small Computer System Interface) connector 225 provides connectivity for preferably up to seven or fifteen SCSI-type devices (depending on the version of SCSI supported by the embodiment). In one embodiment, I/O bridge 222 provides ISA bus 230 having one or more ISA connectors 231 (in one embodiment, three connectors are provided). In one embodiment, ISA bus 230 is coupled to I/O controller 252, which in turn provides connections to two serial ports 254 and 255, parallel port 256, and FDD (Floppy-Disk Drive) connector 257. In one embodiment, FDD connector 257 is connected to FDD 258 that receives removable media (floppy diskette) 259 on which is stored data and/or program code 260. In one such embodiment, program code 260 includes code that controls programmable system 200 to perform the method described below. In another such embodiment, serial port 254 is connectable to a computer network such as the internet, and such network has program code 260 that controls programmable system 200 to perform the method described below. In one embodiment, ISA bus 230 is connected to buffer 232, which is connected to X bus 240, which provides connections to real-time clock 242, keyboard/mouse controller 244 and keyboard BIOS ROM (Basic Input/Output System Read-Only Memory) 245, and to system BIOS ROM 246.

FIG. 2 shows one exemplary embodiment of the present invention, however other bus structures and memory arrangements are specifically contemplated. In one embodiment, I/O bridge 222 is a chip that provides connection and control to one or more independent IDE connectors 224 and SCSI connectors 225, to a USB (Universal Serial Bus) port 226, and to ISA (Industry Standard Architecture) bus 230. In this embodiment, IDE connector 224 provides connectivity for up to two standard IDE-type devices such as hard disk drives or CD-ROM (Compact Disk-Read-Only Memory) drives, and similarly, a second IDE connector (not shown) provides connectivity for up to two IDE-type devices. In one such embodiment, IDE connector 224 and the second IDE connector each provide the EIDE (Enhanced IDE) architecture. In one embodiment, I/O bridge 222 provides ISA bus 230 having one or more ISA connectors 231 (in one embodiment, three connectors are provided). In one embodiment, ISA bus 230 is coupled to I/O controller 252, which in turn provides connections to two serial ports 254 and 255, parallel port 256, and FDD (Floppy-Disk Drive) connector 257. In one embodiment, ISA bus 230 is connected to buffer 232, which is connected to X bus 240, which provides connections to real-time clock 242, keyboard/mouse controller 244 and keyboard BIOS ROM (Basic Input/Output System Read-Only Memory) 245, and to system BIOS ROM 246. It should be appreciated that modification or reconfiguration of information handling system 200 of FIG. 2 by one having ordinary skill in the art would not depart from the scope or the spirit of the present invention.

Figure 3:
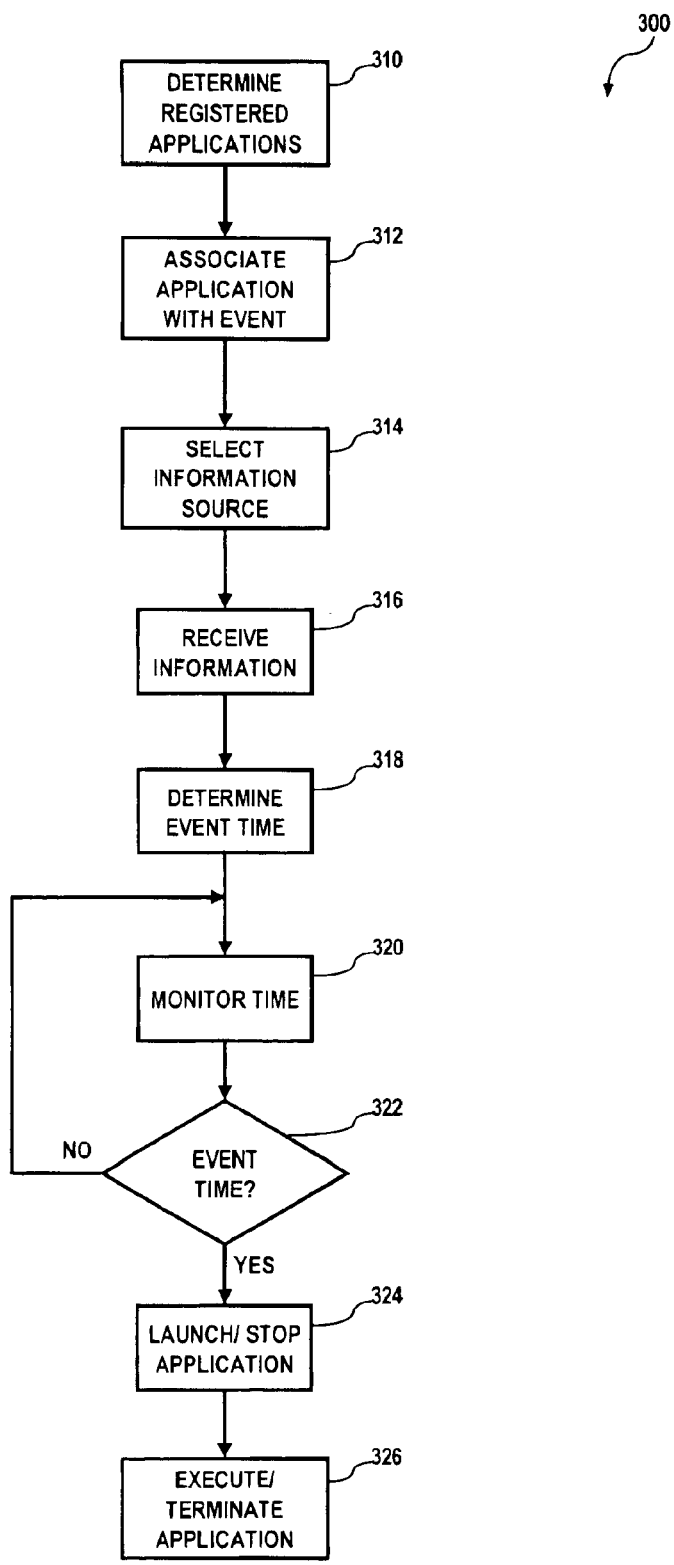
FIG. 3 is a flow diagram of a method for launching an application in accordance with the present invention.

Referring now to FIG. 3, a flow diagram of a method for launching an application in accordance with the present invention will be discussed. Method 300 includes a step 310 for determining registered applications. For example, information handling system 118 of FIG. 1 may maintain a registry database in which applications 120–124 are registered as being installed on information handling system 118. In one embodiment, any one or more of applications 120–124 that need to be started or stopped, for example, relative to EPG database 110 information, may register with EPG 112 through the implementation of a predefined interface. Any one or more of applications 120–124 may be associated with an event at step 312. For example, it may be desired to launch an application that is a channel specific electronic program guide designed to provide programming information specific to a particular channel that a user is receiving and viewing from one of information sources 126–134. Such an application may obtain the channel specific information from EPG database 110 by filtering all channel data for data specific to the currently watched channel. An information source may be selected at step 314, and information from the selected information source is received at step 316. In one embodiment, one of applications 120–124 may be launched at a predetermined time. Alternatively, other events at the predetermined time may be initiated in lieu of launching an application. The event time is determined and set at step 318. For example, it may be desired to launch an application that is a channel specific EPG at a predetermined time, e.g., ten minutes, before the end of a program being broadcast on that specific channel and received by the one of information sources 126–134 selected at step 314. Time is monitored at step 320, for example, by monitoring the output of timer 114, and a determination is made at step 322 whether the present time is the event time. Until the present time is determined to be the event time, time is continued to be monitored at step 320. When the present time is determined to be the event time, the application associated with the event at step 312 is launched at step 324, and the application is executed at step 326. As an example, a user may be watching channel 33 of cable television network 128. EPG 112 may associate a channel specific application to be launched at ten minutes before the end of the program. EPG 112 may then monitor time until ten minutes before the end of the program is reached. At the event time, EPG 112 filters EPG database 110 for program guide information specific to channel 33, launches the channel specific program guide application, and provides the filtered program information to the channel specific program application. The channel specific application then displays the program guide information on display 116 so that the user may view programming information for channel 33, for example, to determine whether it is desired to continue watching channel 33 when the present program is finished. As an alternative to launching a program, the step of launching an application may be defined herein to also include events other than launching an application. For example, step 324 may include the step of terminating, or initiating the termination of, a presently executing application at the predetermined event time determined at step 318. In one embodiment, for example, the application may be a recording application that is recording the information received at step 316 from one of information sources 126–134 selected at step 314. It may be desirable to terminate the recording application at the end of the program being received, for example, on channel 33. EPG 112 determines at what time the program is scheduled to end based upon programming information stored in EPG database 110 for the selected channel and program. The predetermined event time may be determined at step 318 to be at least the end of the selected program. EPG 112 monitors the time reference at step 320 provided by timer 114 to determine at step 322 when the present time is the time determined at step 318. In the event a determination is made at step 322 that the present time is the event time determined at step 318, e.g., the time at which the program received at step 316 is scheduled to end, the application associated at step 312 (e.g., the recording program) stops at step 324, and the recording program may be terminated or closed at step 326.

Figure 4:
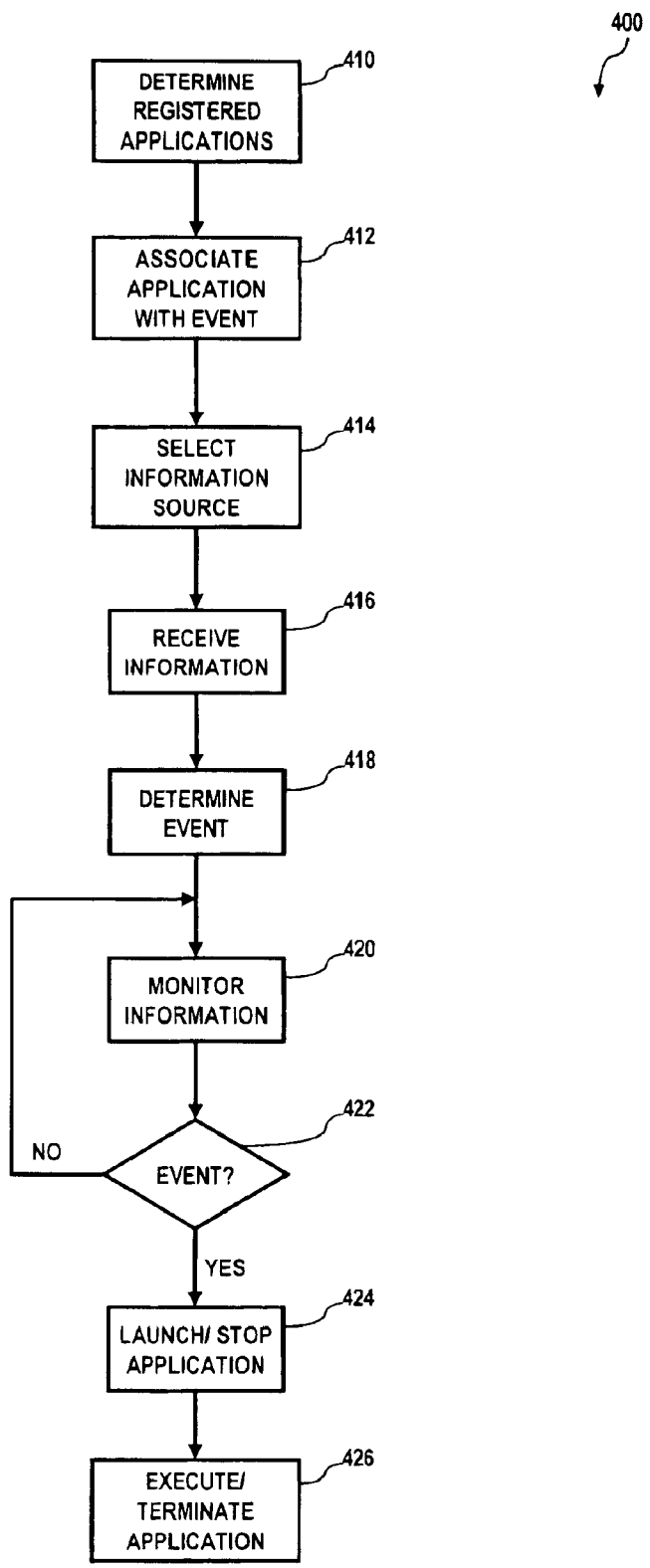
FIG. 4 is a flow diagram of an alternative method for launching an application in accordance with the present invention.

Referring now to FIG. 4, a flow diagram of an alternative method in accordance with the present invention will be discussed. For method 400, steps 410, 412, 414, 416, 418, 420, 422, 424, and 426 are substantially similar to corresponding steps 310, 312, 314, 316, 318, 320, 322, 324, and 326 of method 300. However, step 418 differs from step 318 in that at step 418, any event may be determined as a triggering event, and need not be a time related event as in step 318. Thus, any information determined to be a trigger or triggering event at step 418 may be monitored appropriately at step 420, and a determination may be made at step 422 whether the trigger event information occurs, is determined, or is read by information handling system 118 or EPG 112. For example, EPG 112 may monitor the information received at step 416 for information that would trigger the launching or stopping of the application associated with the event at step 412. For example, rather than monitor time and information in EPG database 110, EPG 112 may monitor information contained in the signal received from the information source selected at step 414. As an example, EPG 112 may be configured to read the video information in a television signal received over airwave network 126 to determine when the end of a program is near or has been reached. In one embodiment, EPG 112 is capable of reading the video information received at step 416 and determining when the video information includes closing credits for the program. The detection of the closing credits may be the event determined at step 418 to be the event that is monitored at step 420 and determined as being satisfied at step 422 to cause an application to be launched or stopped at step 424 and executed or terminated at step 426.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 216 of one or more computer information handling systems configured generally as described in FIG. 2. Until required by the computer system, the set of instructions may be stored in another computer readable memory such as information storage medium 259 of FIG. 2, including a hard disk drive, or a removable memory such as an optical disk for utilization in a CD-ROM drive, a floppy disk for utilization in a floppy disk drive, a floppy/optical disk for utilization in a floppy/optical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions, applets or servlets physically changes the medium upon which it is stored electrically, magnetically, chemically, physically, optically or holographically so that the medium carries computer-readable information.

It is believed that the method and apparatus for launching applications based upon electronic program guide data of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method, comprising:
   maintaining an electronic program guide with a registry for applications to be linked with occurrence of an event in information received by the electronic program guide;

registering an application with the electronic program guide;

associating the registered application with an event;

while receiving information from a selected information source, monitoring event related information by the electronic program guide for an occurrence of the event; and upon an occurrence of the event, causing an operation of the application to be executed.

2. A method as claimed in claim 1, the event being a predetermined time relative to a program and said monitoring step including the monitoring time to determine when the predetermined time occurs.

3. A method as claimed in claim 1, said causing step including launching the application upon an occurrence of the event.

4. A method as claimed in claim 1, said causing step including stopping the application upon an occurrence of the event.

5. A method as claimed in claim 1, further including the step of determining event related information based upon electronic program guide data for the received information.

6. A program of instruction storable on an information storage medium for causing an information handling system to execute steps for causing the operation of an application to occur, the steps comprising:

maintaining an electronic program guide with a registry for applications to be linked with occurrence of an event in information received by the electronic program guide;

registering an application with the electronic program guide;

associating the registered application with an event;

while receiving information from a selected information source, monitoring event related information by the electronic program guide for an occurrence of the event; and upon an occurrence of the event, causing an operation of the application to be executed.

7. A program of instruction as claimed in claim 6, the event being a predetermined time relative to a program and said monitoring step including the monitoring time to determine when the predetermined time occurs.

8. A program of instruction as claimed in claim 6, said causing step including launching the application upon an occurrence of the event.

9. A program of instruction as claimed in claim 6, said causing step including stopping the application upon an occurrence of the event.

10. A program of instruction as claimed in claim 6, the steps further including the step of determining event related information based upon electronic program guide data for the received information.

11. An apparatus providing an electronic program guide, comprising:

means for maintaining an electronic program guide with a registry for applications to be linked with occurrence of an event in information received by the electronic program guide;

means for registering an application with an the electronic program guide;

means for receiving information from one or more information sources, the one or more information sources consisting of air transmitted television, cable television, satellite television, world-wide network, and internal storage medium, the means for receiving selecting one of the one or more information sources;

means for storing programming information related to information capable of being received from the one or more information sources;

means for monitoring for the occurrence of a predetermined event related to information received from the selected one of the one or more information sources; and means for, responsive to the occurrence of the predetermined event, for implementing an operation of the application registered with the electronic program guide.

12. An apparatus as claimed in claim 11, further comprising means for providing a timing reference to said monitoring means.

13. An apparatus as claimed in claim 11, said receiving means being an information handling system capable of receiving the information and displaying the information on a display.

14. An apparatus as claimed in claim 11, said storing means being an electronic program guide database.

15. An apparatus as claimed in claim 11, said monitoring means being the electronic program guide resident as a program on an information handling system.

16. An apparatus as claimed in claim 11, said implementing means being the electronic program guide resident as a program on an information handling system.

17. An apparatus as claimed in claim 11, further comprising a timer circuit for providing a timing reference to said monitoring means.

18. An apparatus as claimed in claim 11, wherein information is monitored.

* * * * *